United States Patent
Ohno

(10) Patent No.: US 8,153,073 B2
(45) Date of Patent: Apr. 10, 2012

(54) HONEYCOMB FILTER, EXHAUST GAS PURIFYING APPARATUS AND METHOD FOR MANUFACTURING HONEYCOMB FILTER

(75) Inventor: Kazushige Ohno, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 504 days.

(21) Appl. No.: 12/342,903

(22) Filed: Dec. 23, 2008

(65) Prior Publication Data

US 2009/0238732 A1    Sep. 24, 2009

(30) Foreign Application Priority Data

Mar. 24, 2008    (WO) .................. PCT/JP2008/055462

(51) Int. Cl.
*B01D 50/00*    (2006.01)
(52) U.S. Cl. ........................ 422/180; 422/177
(58) Field of Classification Search .................. 422/177, 422/179, 180
See application file for complete search history.

(56) References Cited

U.S. PATENT DOCUMENTS

| | | | |
|---|---|---|---|
| 4,777,152 A * | 10/1988 | Tsukada ......................... | 501/80 |
| 5,914,187 A | 6/1999 | Naruse et al. | |
| 6,669,751 B1 | 12/2003 | Ohno et al. | |
| 7,112,233 B2 | 9/2006 | Ohno et al. | |
| 7,284,980 B2 | 10/2007 | Saijo et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |
| 7,396,586 B2 | 7/2008 | Ohno et al. | |
| 7,427,308 B2 | 9/2008 | Taoka et al. | |
| 7,427,309 B2 | 9/2008 | Ohno et al. | |
| 7,438,967 B2 | 10/2008 | Fujita | |
| 7,449,427 B2 | 11/2008 | Ohno et al. | |

(Continued)

FOREIGN PATENT DOCUMENTS

CN        1735743        2/2006

(Continued)

OTHER PUBLICATIONS

Chinese Office Action for corresponding CN Application No. 200910004287.4, Dec. 6, 2010.

(Continued)

*Primary Examiner* — Tom Duong
(74) *Attorney, Agent, or Firm* — Ditthavong Mori & Steiner, P.C.

(57) ABSTRACT

A honeycomb filter includes a ceramic block which includes a plurality of honeycomb fired bodies, an adhesive layer, and irregularities on a peripheral face of the ceramic block. Each honeycomb fired body has a longitudinal direction and cell walls extending along the longitudinal direction to define cells each sealed at either one of both ends of each of the cells. The honeycomb fired bodies include at least one of silicon carbide and silicon-containing silicon carbide. The adhesive layer is provided between the honeycomb fired bodies to connect the honeycomb fired bodies. The irregularities on the peripheral face include a projected portion formed by a part of the cell walls. A sealing material layer is provided on the peripheral face of the ceramic block in accordance with the irregularities on the peripheral face so that an outer peripheral surface of the honeycomb filter has surface irregularities thereon.

28 Claims, 8 Drawing Sheets

U.S. PATENT DOCUMENTS

| | | |
|---|---|---|
| 7,462,216 B2 | 12/2008 | Kunieda et al. |
| 7,473,465 B2 | 1/2009 | Ohno et al. |
| 7,491,057 B2 | 2/2009 | Saijo et al. |
| 7,498,544 B2 | 3/2009 | Saijo et al. |
| 7,504,359 B2 | 3/2009 | Ogyu et al. |
| 7,520,178 B2 | 4/2009 | Ohno et al. |
| 7,524,350 B2 | 4/2009 | Kunieda |
| 7,540,898 B2 | 6/2009 | Oshimi |
| 7,543,513 B2 | 6/2009 | Kobayashi et al. |
| 7,550,026 B2 | 6/2009 | Hayakawa |
| 7,556,666 B2 | 7/2009 | Kunieda |
| 2004/0161596 A1 | 8/2004 | Taoka et al. |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029898 A1 | 2/2006 | Saijo et al. |
| 2006/0043652 A1 | 3/2006 | Saijo et al. |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0269722 A1 | 11/2006 | Yamada |
| 2007/0009707 A1 | 1/2007 | Ogura et al. |
| 2007/0020155 A1 | 1/2007 | Ohno et al. |
| 2007/0028575 A1 | 2/2007 | Ohno et al. |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0144561 A1 | 6/2007 | Saijo et al. |
| 2007/0148403 A1 | 6/2007 | Yamamura et al. |
| 2007/0152382 A1 | 7/2007 | Yamada et al. |
| 2007/0175060 A1 | 8/2007 | Idei et al. |
| 2007/0178275 A1 | 8/2007 | Takahashi |
| 2007/0187651 A1 | 8/2007 | Naruse et al. |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0199643 A1 | 8/2007 | Kawai et al. |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262497 A1 | 11/2007 | Yamamura et al. |
| 2007/0262498 A1 | 11/2007 | Saijo et al. |
| 2007/0277655 A1 | 12/2007 | Kawai et al. |
| 2007/0293392 A1 | 12/2007 | Ohno et al. |
| 2008/0006971 A1 | 1/2008 | Kawai et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0111274 A1 | 5/2008 | Kawai et al. |
| 2008/0116200 A1 | 5/2008 | Kawai et al. |
| 2008/0116601 A1 | 5/2008 | Naruse et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0150200 A1 | 6/2008 | Tajima |
| 2008/0157445 A1 | 7/2008 | Kawai et al. |
| 2008/0160249 A1 | 7/2008 | Makino |
| 2008/0174039 A1 | 7/2008 | Saijo et al. |
| 2008/0179781 A1 | 7/2008 | Iwata |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0251977 A1 | 10/2008 | Naruse et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0079111 A1 | 3/2009 | Kasai et al. |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1623750 | 2/2006 |
| EP | 1736221 | 12/2006 |
| EP | 1757351 | 2/2007 |
| JP | 2001-162121 | 6/2001 |
| JP | 2004-051384 | 2/2004 |
| JP | 2007-014886 | 1/2007 |
| JP | 2007-054822 | 3/2007 |
| KR | 10-0637298 | 6/2006 |
| WO | WO 2005/045210 | 5/2005 |
| WO | WO 2005/099865 | 10/2005 |
| WO | WO 2006/137151 | 12/2006 |

OTHER PUBLICATIONS

Korean Office Action for corresponding KR Application No. 10-2009-0012890, Dec. 2, 2010.

* cited by examiner

A-A line cross-sectional view

US 8,153,073 B2

HONEYCOMB FILTER, EXHAUST GAS PURIFYING APPARATUS AND METHOD FOR MANUFACTURING HONEYCOMB FILTER

CROSS-REFERENCE TO RELATED APPLICATIONS

The present application claims priority under 35 U.S.C. §119 to PCT Application No. PCT/JP2008/055462, filed Mar. 24, 2008, the contents of which are incorporated herein by reference in their entirety.

BACKGROUND OF THE INVENTION

1. Field of the Invention

The present invention relates to a honeycomb filter, an exhaust gas purifying apparatus including the honeycomb filter, and a method for manufacturing the honeycomb filter.

2. Discussion of the Background

In recent years, particulate matter (hereinafter, also referred to as "PM") such as soot discharged from internal combustion engines of vehicles such as buses and trucks, construction machines and the like has raised serious problems as contaminants harmful to the environment and the human body. For this reason, various honeycomb filters, which use a porous ceramic honeycomb structure, have been proposed as filters that capture PM in exhaust gases and purify the exhaust gases.

As a material for such a honeycomb filter, silicon carbide has been known. In the case where silicon carbide is used as the material for the honeycomb filter, since the silicon carbide has a high coefficient of thermal expansion, a structure of an aggregated honeycomb filter is adopted, in which a plurality of pillar-shaped porous ceramic sintered bodies (honeycomb fired bodies), each having a large number of cells longitudinally placed in parallel with one another, are combined with one another.

As such an aggregated honeycomb filter, JP-A 2001-162121 has disclosed a honeycomb filter including an aggregated body of honeycomb fired bodies (ceramic block) manufactured by combining a plurality of honeycomb fired bodies with one another, cutting a periphery of the ceramic block so as to have a cross-section in an almost circular shape or the like, and forming a smoothing layer on the peripheral face having irregularities thereon exposed by the cutting process. The smoothing layer is formed by filling irregularities corresponding to the shapes of the cell walls exposed by the cutting process so that the honeycomb filter is formed into a round pillar shape or the like.

The contents of JP-A 2001-162121 are incorporated herein by reference in their entirety.

SUMMARY OF THE INVENTION

According to one aspect of the present invention, a honeycomb filter includes a ceramic block having a peripheral face with irregularities. The ceramic block includes a plurality of honeycomb fired bodies, an adhesive layer, and the irregularities on the peripheral face. Each of the plurality of honeycomb fired bodies has a longitudinal direction and a plurality of cell walls extending along the longitudinal direction to define a plurality of cells each sealed at either one of both ends of each of the cells. The plurality of honeycomb fired bodies include at least one of silicon carbide and silicon-containing silicon carbide. The adhesive layer is provided between the plurality of honeycomb fired bodies to connect the plurality of honeycomb fired bodies. The irregularities on the peripheral face include a projected portion formed by a part of the plurality of cell walls. A sealing material layer is provided on the peripheral face of the ceramic block in accordance with the irregularities on the peripheral face so that an outer peripheral surface of the honeycomb filter has surface irregularities thereon.

According to another aspect of the present invention, an exhaust gas purifying apparatus includes a honeycomb filter, a casing, and a holding material. The casing houses the honeycomb filter. The holding material is provided between the honeycomb filter and the casing to hold the honeycomb filter in the casing. The honeycomb filter includes a ceramic block having a peripheral face with irregularities. The honeycomb filter includes a plurality of honeycomb fired bodies, an adhesive layer, and the irregularities on the peripheral face. Each of the plurality of honeycomb fired bodies has a longitudinal direction and a plurality of cell walls extending along the longitudinal direction to define a plurality of cells each sealed at either one of both ends of each of the cells, the plurality of honeycomb fired bodies including at least one of silicon carbide and silicon-containing silicon carbide. The adhesive layer is provided between the plurality of honeycomb fired bodies to connect the plurality of honeycomb fired bodies. The irregularities on the peripheral face include a projected portion formed by a part of the plurality of cell walls. A sealing material layer is provided on the peripheral face of the ceramic block in accordance with the irregularities on the peripheral face so that an outer peripheral surface of the honeycomb filter has surface irregularities thereon.

According to further aspect of the present invention, a method for manufacturing a honeycomb filter includes preparing a wet mixture including at least one of silicon carbide and silicon-containing silicon carbide. The wet mixture is extrusion-molded to manufacture honeycomb molded bodies each having a longitudinal direction and a plurality of cell walls extending along the longitudinal direction to define a plurality of cells. A plug material paste is provided in the cells to seal either one of both ends of each of the cells.

The sealed honeycomb molded bodies are fired to manufacture a honeycomb fired bodies. A first sealing material paste is applied to a side face of one of the honeycomb fired bodies to form a sealing material paste layer thereon. Another of the honeycomb fired bodies is laminated on the first sealing material paste layer to manufacture an aggregated body of honeycomb fired bodies. The aggregated body of honeycomb fired bodies is heated so that the first sealing material paste layer is dried and solidified to produce a ceramic block. A second sealing material paste is applied to a peripheral face of the ceramic block in accordance with irregularities formed thereon so that an outer peripheral surface of the honeycomb filter has surface irregularities thereon. The second sealing material paste is dried and solidified to form a sealing material layer on the peripheral face of the ceramic block.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
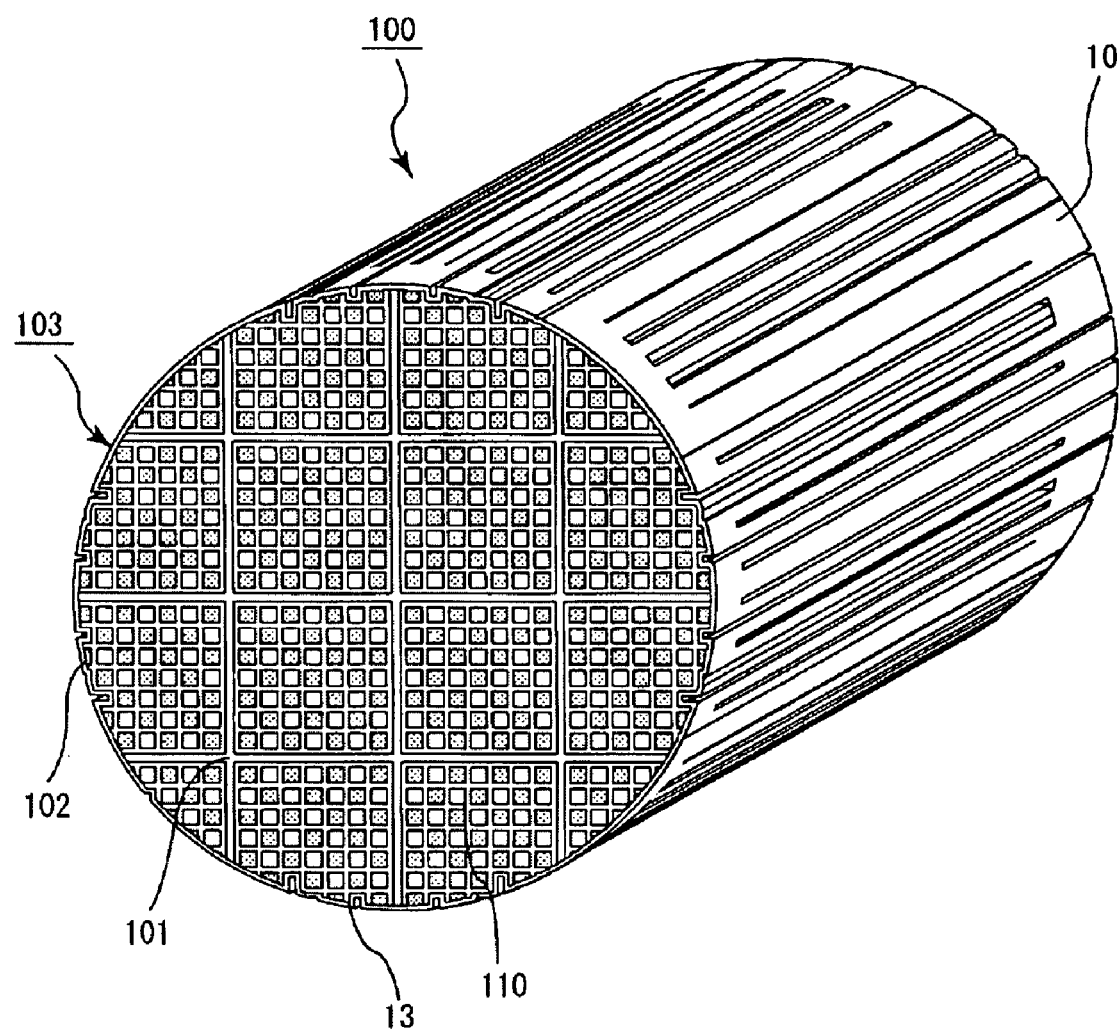
FIG. 1 is a perspective view schematically showing one example of a honeycomb filter according to one embodiment of the present invention.

Embodiments will now be described with reference to the accompanying drawings, wherein like reference numerals designate corresponding or identical elements throughout the various drawings.

A honeycomb filter according to embodiments of the present invention includes: a ceramic block formed by a plurality of honeycomb fired bodies combined with one another with an adhesive layer interposed therebetween, each of the honeycomb fired bodies having a large number of cells each sealed at either end of the cells and placed longitudinally in parallel with one another with a cell wall therebetween; and a sealing material layer formed on a peripheral face of the ceramic block, the honeycomb fired bodies including silicon carbide or silicon-containing silicon carbide, the ceramic block having the peripheral face with irregularities formed thereon, the irregularities on the peripheral face of the ceramic block including a projected portion formed by a part of the cell wall projecting from the cell wall, the sealing material layer being formed along the irregularities on the peripheral face of the ceramic block, and the honeycomb filter having a peripheral face with irregularities existing thereon.

In the honeycomb filter according to the embodiments of the present invention, irregularities are formed on a peripheral face of the ceramic block formed by combining a plurality of honeycomb fired bodies with one another, and a sealing material layer is formed along the irregularities.

The sealing material layer is formed so as not to completely fill the irregularities on the peripheral face of the ceramic block.

That is, the peripheral face of the honeycomb filter is not smooth, and irregularities exist on the peripheral face of the honeycomb filter.

In the case where the irregularities exist on the peripheral face of the honeycomb filter, a coefficient of friction between the holding sealing material wound around the honeycomb filter and the peripheral face of the honeycomb filter becomes higher during an installation of the honeycomb filter in a casing. For this reason, even when thermal expansion and thermal shrinkage due to application of heat are repeated in a honeycomb filter manufactured by using a material having a high coefficient of thermal expansion such as silicon carbide or silicon-containing silicon carbide, it may be easier to prevent the displacement of the honeycomb filter from the originally installed position in the casing.

When the cell is sealed by a plug, "a projected portion formed by a part of the cell wall projecting from the cell wall" means the projecting portion of the cell wall except the plug on the peripheral face of the ceramic block.

The honeycomb filter according to the embodiments of the present invention will be described in terms of its advantageous effects with respect to conventional honeycomb filters.

Normally, a honeycomb filter used for purifying exhaust gases is wrapped with a holding sealing material including ceramic fibers and the like on the periphery thereof and installed in a casing that is placed in the middle of an exhaust pipe.

When the honeycomb filter is installed in the casing, a pressure is applied from the inner wall surface of the casing toward the center of the cross section of the honeycomb filter in the longitudinal direction thereof so that a displacement of the honeycomb filter in the casing is prevented.

Here, in recent years, with respect to the honeycomb filter, there have been demands for making a thickness of the cell wall thinner to increase the porosity of the cell walls so that a pressure loss is reduced. For this reason, mechanical strength of the honeycomb filter tends to be lower in comparison with that of a conventional honeycomb filter.

Accordingly, in order to prevent a damage of the honeycomb filter during an installation of the honeycomb filter in the casing, it is necessary to lower the pressure to be applied to the honeycomb filter during the installation of the honeycomb filter in the casing, in comparison with the conventionally applied pressure.

In the case where the pressure to be applied to the honeycomb filter during the installation of the honeycomb filter in the casing is lowered, however, the application of a honeycomb filter in which the smoothing layer is formed to fill the irregularities on the periphery of the honeycomb filter, such as the conventional honeycomb filter disclosed in JP-A 2001-162121, tends to cause the displacement of the honeycomb filter in the casing during the use of the honeycomb filter.

In particular, when a regenerating process for burning PM collected in the honeycomb filter is carried out, there may be a case where the honeycomb filter is displaced from the originally installed position in the casing during the process where the honeycomb filter is expanded due to heat generated in the burning and the honeycomb filter is then shrunk along with lowering of the temperature of the honeycomb filter.

Moreover, the displacement of the honeycomb filter caused by the above reason tends to occur particularly in the honeycomb filter manufactured by using a material having a high coefficient of thermal expansion such as silicon carbide.

In comparison with such conventional honeycomb filters, the honeycomb filter according to the embodiments of the present invention tends not to be displaced from an originally installed position in the casing when being used, even manufactured by using a material having a high coefficient of thermal expansion such as silicon carbide.

In the honeycomb filter according to the embodiments of the present invention, the irregularities on the peripheral face of the ceramic block are formed by processing of a periphery of a ceramic block.

In the honeycomb filter according to the embodiments of the present invention, the sealing material layer is formed along all the surfaces of the irregularities on the peripheral face of the ceramic block.

In the honeycomb filter according to the embodiments of the present invention, each of the irregularities on the peripheral face of the honeycomb filter has a depth of at least about 0.1 mm and at most about 0.5 mm.

When the depth of the irregularities is about 0.1 mm or more, the coefficient of friction between the holding sealing material and the peripheral face of the honeycomb filter tends to be made higher.

Further, when the depth of the irregularities is about 0.5 mm or less, it may be easier to prevent exhaust gases having not passed through the cell wall from flowing into a gap (space) between the honeycomb filter and the holding sealing material.

In the honeycomb filter according to the embodiments of the present invention, the adhesive layer and the sealing material layer include the same material.

First Embodiment

In the following, an embodiment of the honeycomb filter of the present invention will be described with reference to drawings.

FIG. 1 is a perspective view schematically showing one example of a honeycomb filter according to one embodiment of the present invention.

In a honeycomb filter 100 shown in FIG. 1, a ceramic block 103 is formed by combining a plurality of honeycomb fired bodies 110 including porous silicon carbide or silicon-containing silicon carbide with an adhesive layer 101 interposed therebetween, and further, a sealing material layer 102 is formed on a peripheral face 13 of this ceramic block 103.

The honeycomb filter 100 shown in FIG. 1 has an almost round pillar shape, and irregularities are formed on a peripheral face 10 (side face of the almost round pillar-shaped honeycomb filter) of the honeycomb filter 100.

The shape of the irregularities on the peripheral face 10 of the honeycomb filter 100 corresponds to the shape of the irregularities on the peripheral face 13 of the ceramic block 103.

In the following, there will be described the honeycomb fired body constituting the honeycomb filter having irregularities on the peripheral face, the ceramic block including a plurality of the honeycomb fired bodies combined with one another, as well as a honeycomb filter with a sealing material layer formed on the peripheral face of the ceramic block and the sealing material layer.

First, there is described a honeycomb fired body.

Figure 2A:
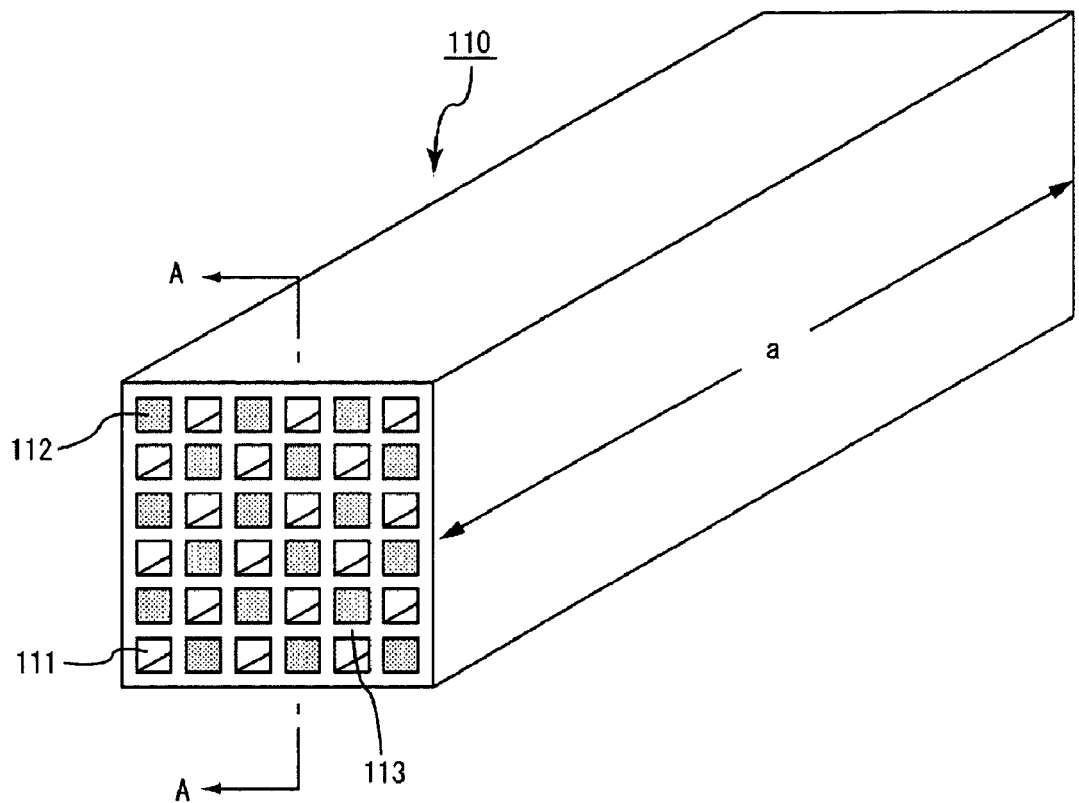
FIG. 2A is a perspective view schematically showing one example of a honeycomb fired body constituting a honeycomb filter according to one embodiment of the present invention.
Figure 2B:
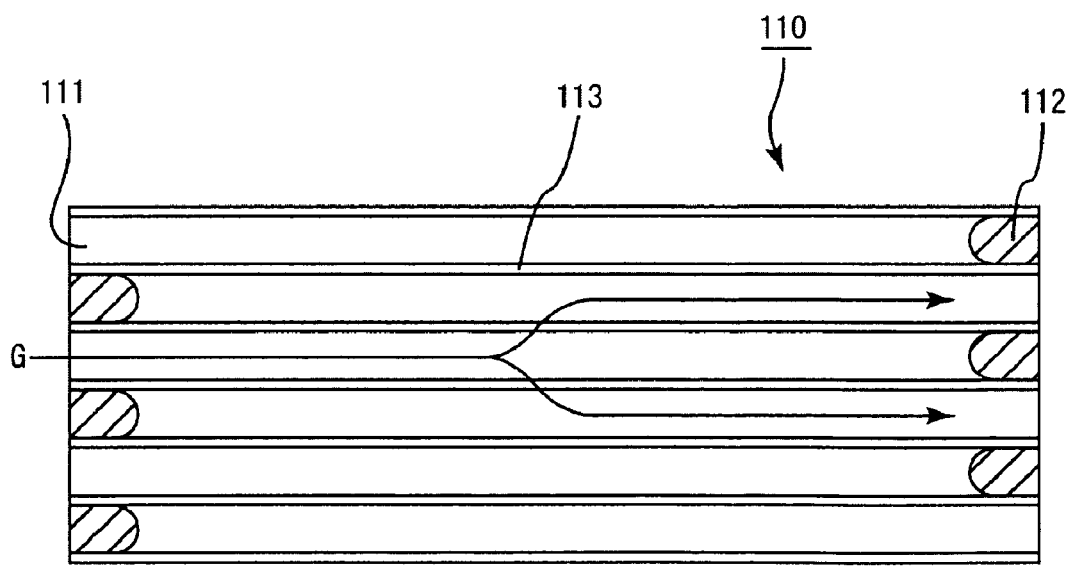
FIG. 2B is an A-A line cross-sectional view of the honeycomb fired body shown in FIG. 2A.

FIG. 2A is a perspective view schematically showing one example of a honeycomb fired body constituting a honeycomb filter according to one embodiment of the present invention, and FIG. 2B is an A-A line cross-sectional view of the honeycomb fired body shown in FIG. 2A.

In a honeycomb fired body 110 shown in FIG. 2A and FIG. 2B, a large number of cells 111 are disposed in parallel with one another with a cell wall 113 therebetween in the longitudinal direction (the direction shown by an arrow "a" in FIG. 2A), and either one end of each of the cells 111 is sealed by a plug 112. Therefore, exhausted gases G flowing into one cell 111 with an opening on one end face are to be discharged from another cell 111 with an opening on the other end face after surely passing through a cell wall 113 between the cells 111.

Consequently, the cell wall 113 is allowed to function as a filter to capture PM and the like.

Subsequently, a ceramic block including a plurality of honeycomb fired bodies combined with one another is described.

Figure 3:
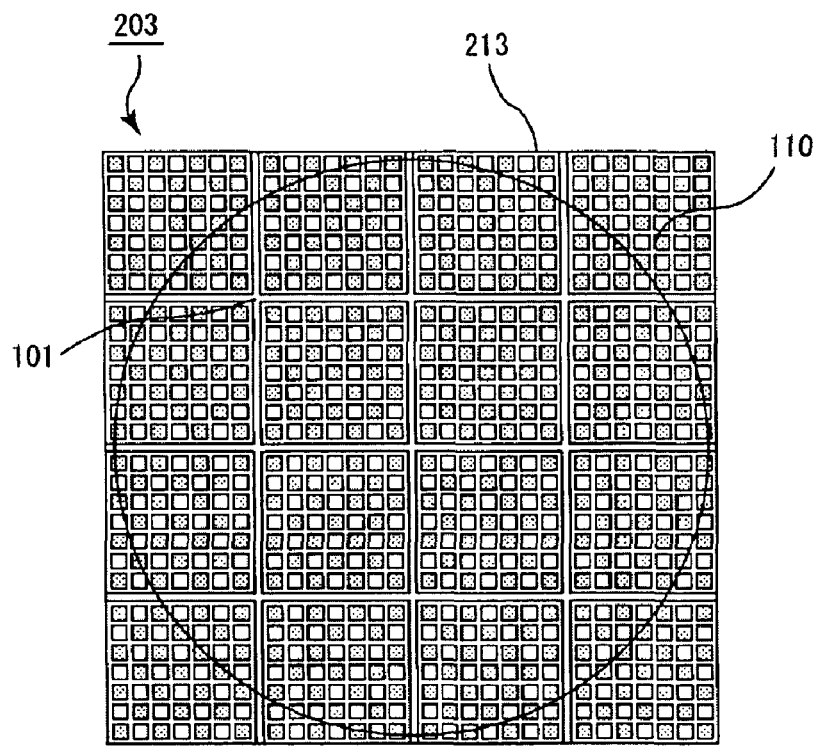
FIG. 3 is a side view of a rectangular pillar-shaped ceramic block constituting a honeycomb filter according to one embodiment of the present invention.

FIG. 3 is a side view of a rectangular pillar-shaped ceramic block including 16 rectangular pillar-shaped honeycomb fired bodies constituting a honeycomb filter according to one embodiment of the present invention combined with one another.

A rectangular pillar-shaped ceramic block 203 shown in FIG. 3 includes a total of 16 rectangular pillar-shaped honeycomb fired bodies 110, four each in the lengthwise and breadth wise directions, combined with an adhesive layer 101 interposed therebetween.

A peripheral face 213 of the ceramic block 203 is smooth.

A circle shown in FIG. 3 indicates a face along which the periphery of the ceramic block 203 is processed, and by processing the periphery of the rectangular pillar-shaped ceramic block 203, a ceramic block having an almost round pillar shape is manufactured.

Figure 4:
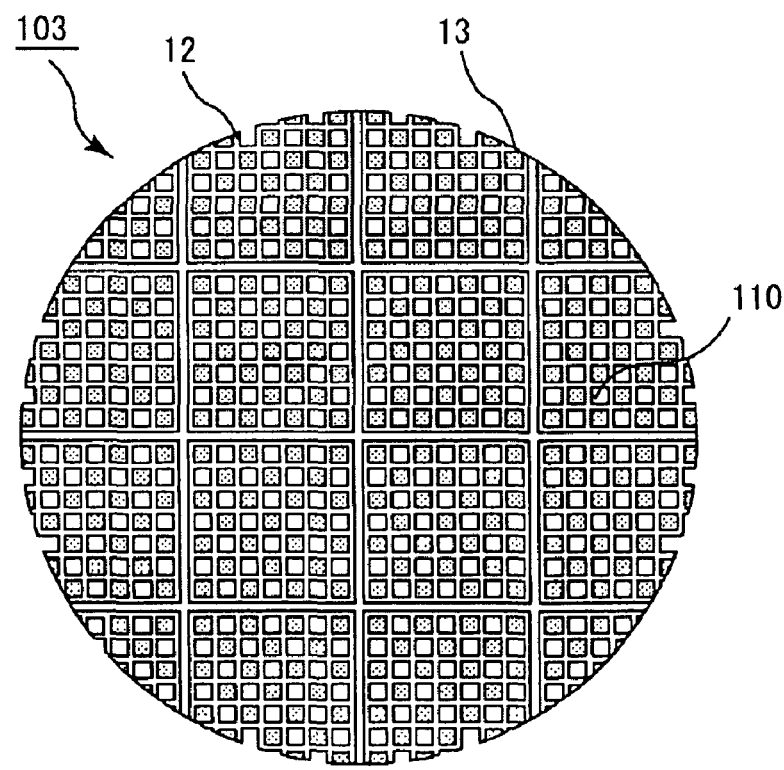
FIG. 4 is a side view of an almost round pillar-shaped ceramic block obtained by processing the periphery of the rectangular pillar-shaped ceramic block shown in FIG. 3.

FIG. 4 is a side view of an almost round pillar-shaped ceramic block obtained by processing the periphery of the rectangular pillar-shaped ceramic block shown in FIG. 3.

The peripheral face 13 of the almost round pillar-shaped ceramic block 103 shown in FIG. 4 is not smooth, but irregularities are formed on the peripheral face 13 of the ceramic block 103.

The irregularities on the peripheral face 13 of the ceramic block 103 include projected portions 12, each formed by a part of the cell wall of the honeycomb fired body 110 projecting from the cell wall.

Here, the shape of the irregularities on the peripheral face 13 of the ceramic block 103 corresponds to the shape of the cell walls of the honeycomb fired bodies 110 and the position where the periphery of the ceramic block is processed.

Subsequently, a honeycomb filter in which a sealing material layer (also referred to as a coat layer) is formed on the peripheral face of the ceramic block and the sealing material layer (coat layer) will be explained.

Figure 5:
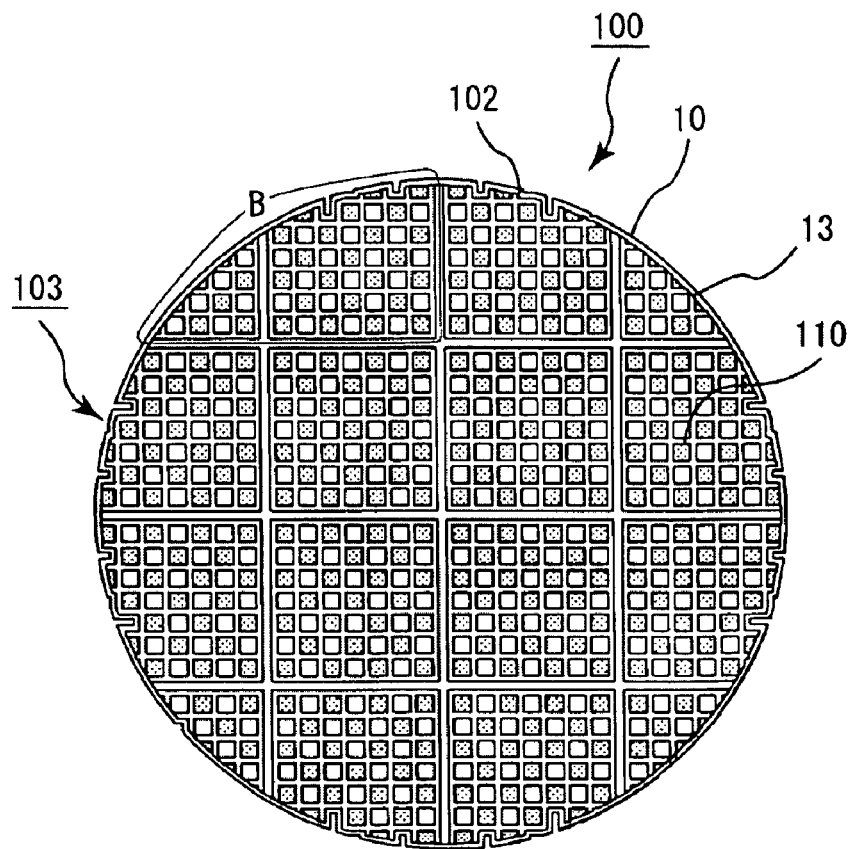
FIG. 5 is a side view of a honeycomb filter obtained by forming a sealing material layer on a peripheral face of the ceramic block shown in FIG. 4.

FIG. 5 is a side view of the honeycomb filter obtained by forming a sealing material layer on the peripheral face of the ceramic block shown in FIG. 4.

Here, FIG. 5 is also the side view of the honeycomb filter 100 shown in FIG. 1.

The sealing material layer 102 is formed along the irregularities on the peripheral face 13 of the ceramic block 103, and particularly formed along all the surfaces of irregularities on the peripheral face 13 of the ceramic block 103.

The sealing material layer 102 is formed by applying a sealing material paste to the peripheral face 13 of the ceramic block 103 so as to make the thickness of the sealing material layer 102 thin, for the purpose of not filling all the irregularities on the peripheral face 13 (without smoothing the irregularities) and allowing the irregularities to remain (exist).

Accordingly, on the peripheral face 10 of the honeycomb filter 100, there exist the irregularities derived from the irregularities on the peripheral face 13 of the ceramic block 103, and the shape of irregularities existing on the peripheral face 10 of the honeycomb filter 100 corresponds to the shape of the irregularities on the peripheral face 13 of the ceramic block 103.

Figure 6:
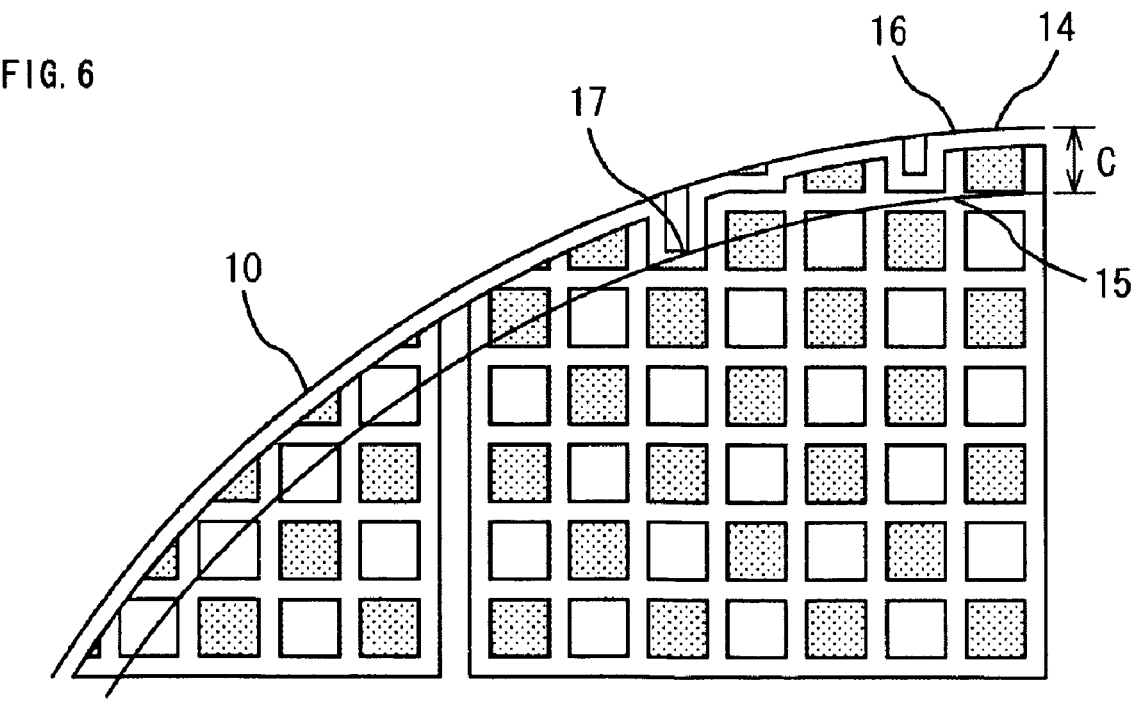
FIG. 6 is an enlarged cross-sectional view showing an area surrounded by a curved line B in FIG. 5.

FIG. 6 is an enlarged cross-sectional view showing an area surrounded by a curved line B in FIG. 5.

The definition of the depth of the irregularities that exist on peripheral face of the honeycomb filter in the present description is described with reference to FIG. 6.

A circle 14 is drawn so as to be tangent to a projecting portion 16 that most projects outward on the peripheral face 10 of the honeycomb filter. The surface indicated by this circle is defined as "a projecting face".

Next, a circle 15 is drawn inside this circle 14 so as to be tangent to a recessed portion 17 that is most recessed on the peripheral face of the honeycomb filter. A surface indicated by the circle 15 is defined as "a recessed face".

The gap between the circle 14 indicating the projecting face and the circle 15 indicating the recessed face (length indicated by an arrow "C" in FIG. 6) is defined as the depth of the irregularities on the peripheral face of the honeycomb filter.

The depth of the irregularities on the peripheral face of the honeycomb filter is desirably at least about 0.1 mm and at most about 0.5 mm.

Moreover, in the case where the shape of a honeycomb filter is not the almost round pillar shape, for example, in the case of a cylindroid shape, an elliptical shape can be used in place of the circle, when the projecting face and the recessed face are determined. That is, a figure similar to the cross-sectional shape of the honeycomb filter may be used.

Moreover, irrespective of the cross-sectional shape of the honeycomb filter, it is only necessary to use the similar shape for the figure used for determining the projecting face and the figure used for determining the recessed face.

Although not particularly limited, examples of the material for forming the sealing material layer include an inorganic binder, an organic binder, inorganic fibers, inorganic particles or a combination thereof.

The thickness of the sealing material layer is not particularly limited, as long as the thickness is determined depending on the size of the cells of the honeycomb fired bodies constituting the honeycomb filter so that irregularities exist on the peripheral face of the honeycomb filter, and is desirably at least about 0.1 mm and at most about 0.5 mm.

The following description will discuss a method for manufacturing the honeycomb filter of the present embodiment.

First, as a ceramic raw material, silicon carbide powders having different average particle diameters, an organic binder, a plasticizer in liquid form, a lubricant and water are mixed to prepare a wet mixture for manufacturing a molded body.

Successively, this wet mixture is loaded into an extrusion molding machine.

When the wet mixture is loaded into the extrusion molding machine, the wet mixture is extrusion-molded into a honeycomb molded body having a predetermined shape.

Next, the honeycomb molded body is cut into a predetermined length, and dried by using a drying apparatus, such as a microwave drying apparatus, a hot-air drying apparatus, a dielectric drying apparatus, a reduced-pressure drying apparatus, a vacuum drying apparatus and a freeze drying apparatus, and a sealing process is carried out by filling predetermined cells with a plug material paste to be a plug for sealing the cells.

Subsequently, the honeycomb molded body is degreased in a degreasing furnace so as to heat organic substances contained in the honeycomb molded body and firing process is carried out thereon.

Accordingly, a rectangular pillar-shaped honeycomb fired body as shown in FIG. 2A and FIG. 2B is manufactured.

Here, as conditions to carry out processes of cutting, drying, sealing, degreasing and firing, conditions used for manufacturing a conventional honeycomb fired body can be used.

Further, a sealing material paste, which is to be an adhesive layer, is applied to a side face of the resulting honeycomb fired body to form a sealing material paste layer thereon, and another honeycomb fired body is successively laminated with this sealing material paste layer interposed therebetween. By repeating these processes, an aggregated body of honeycomb fired bodies with a predetermined number of honeycomb fired bodies combined with one another is manufactured. Here, with respect to the sealing material paste, a material containing an inorganic binder, an organic binder, and at least one of inorganic fibers and inorganic particles may be used.

Furthermore, the aggregated body of the honeycomb fired bodies is heated so that the sealing material paste layer is dried and solidified to form an adhesive layer and the rectangular pillar-shaped ceramic block as shown in FIG. 3 is manufactured.

Subsequently, a cutting process is carried out on the periphery of the ceramic block by using a diamond cutter so that a ceramic block having an almost round pillar shape as shown in FIG. 4 is manufactured.

On the peripheral face of the ceramic block having the almost round pillar shape formed by the cutting process, irregularities including projected portions, each formed by a part of the cell wall of the honeycomb fired body projecting from the cell wall, are formed.

Moreover, a sealing material paste is thinly applied to the peripheral face of the ceramic block along the irregularities formed thereon so as to allow the irregularities to exist (remain). As the sealing material paste, the same sealing material paste as that used when the adhesive layer is formed may be used.

The applying process of the sealing material paste can be carried out by using a squeegee or the like.

More specifically, a sealing material paste having a low viscosity is prepared by adding water or the like to the sealing material paste used for forming the adhesive layer, and the obtained sealing material paste is applied to the peripheral face of the ceramic block. Then, by making the ceramic block with the sealing material paste coated thereon pass through the squeegee having a cylindrical (pipe) shape, the application of the sealing material paste can be carried out.

In this case, irregularities are allowed to exist (remain) on the peripheral face by adjusting the gap between the squeegee and the ceramic block and the pressure to be applied to the ceramic block from the squeegee.

Moreover, the sealing material paste thus applied is dried and solidified, so that a sealing material layer is formed on the peripheral face of the ceramic block.

By following the above processing, a honeycomb filter having a peripheral face on which the irregularities exist (remain), as shown in FIG. 5, can be manufactured.

When manufacturing the honeycomb filter of the present embodiment, the rectangular pillar-shaped ceramic block may be manufactured without sealing the cells which will form the peripheral face of the almost round pillar-shaped ceramic block out of the cells of the honeycomb molded body, and the cutting process may be carried out to this almost round pillar-shaped ceramic block.

Thereby, the honeycomb filter, in which the irregularities are formed on the peripheral face of a honeycomb filter uninterruptedly from one end face side to another end face side, can be manufactured. This honeycomb filter has the same shape as the honeycomb filter according to a second embodiment described later (see FIGS. 10 and 11).

The honeycomb filter of the present embodiment is installed in an exhaust gas purifying apparatus, and used for purifying exhaust gases.

An exhaust gas purifying apparatus according to the embodiments of the present invention in which the honeycomb filter of the present embodiment is installed will be described hereinafter.

Figure 7:
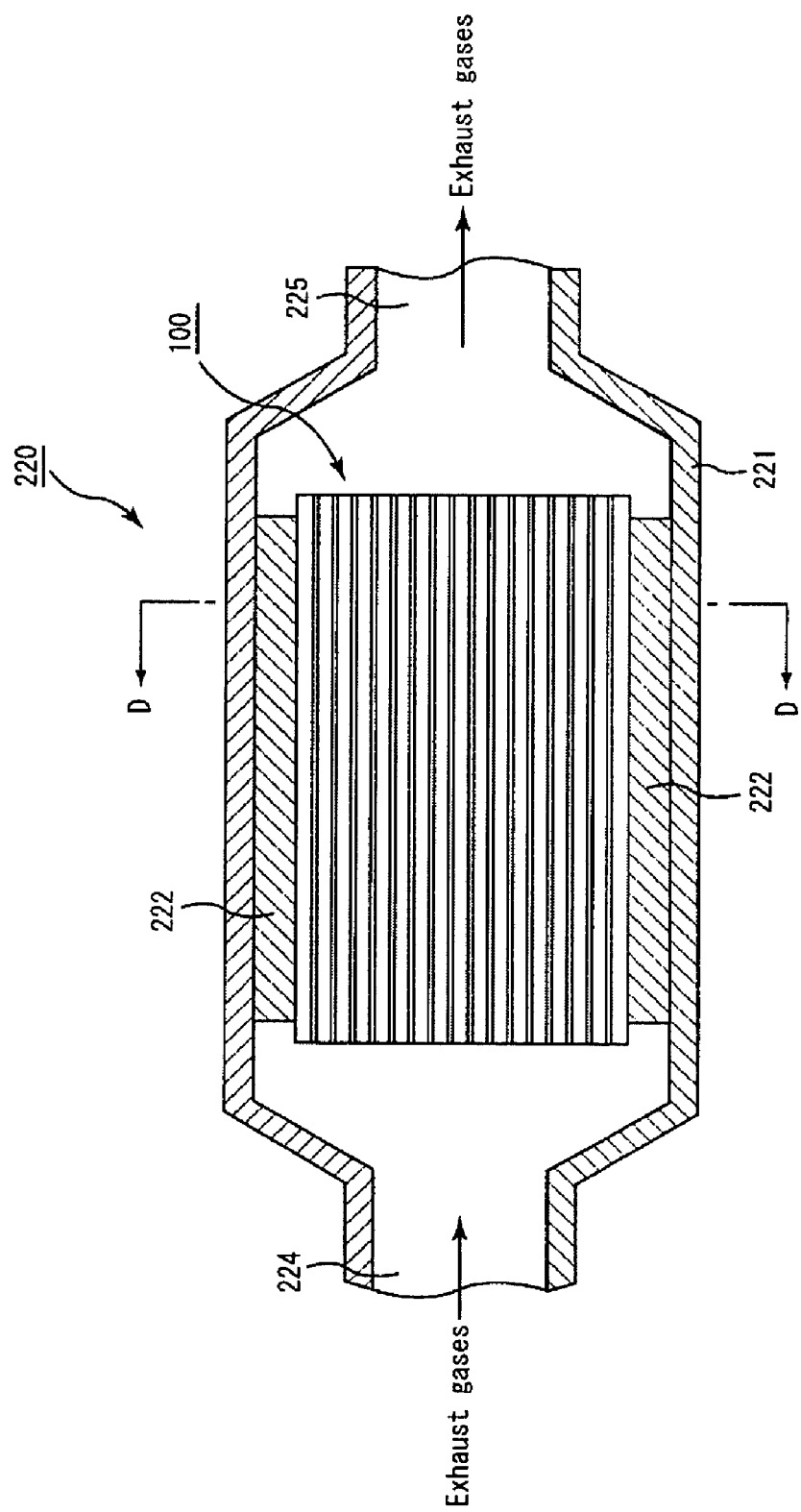
FIG. 7 is a cross-sectional view of an exhaust gas purifying apparatus provided with the honeycomb filter of a first embodiment.

FIG. 7 is a cross-sectional view of the exhaust gas purifying apparatus according to one embodiment of the present invention provided with the honeycomb filter of the present embodiment.

An exhaust gas purifying apparatus 220 according to the embodiments of the present invention mainly includes the honeycomb filter 100, a casing 221 that covers the outside of the honeycomb filter 100, and a holding sealing material 222 (heat insulating material) interposed between the honeycomb filter 100 and the casing 221. Further, an introducing pipe 224, which is coupled to an internal combustion engine such as an engine, is connected to one end portion of the casing 221 on the side from which exhaust gases are introduced, and an exhaust pipe 225 coupled to the outside is connected to the other end portion of the casing 221. Here, in FIG. 7, arrows show flows of exhaust gases.

Figure 8:
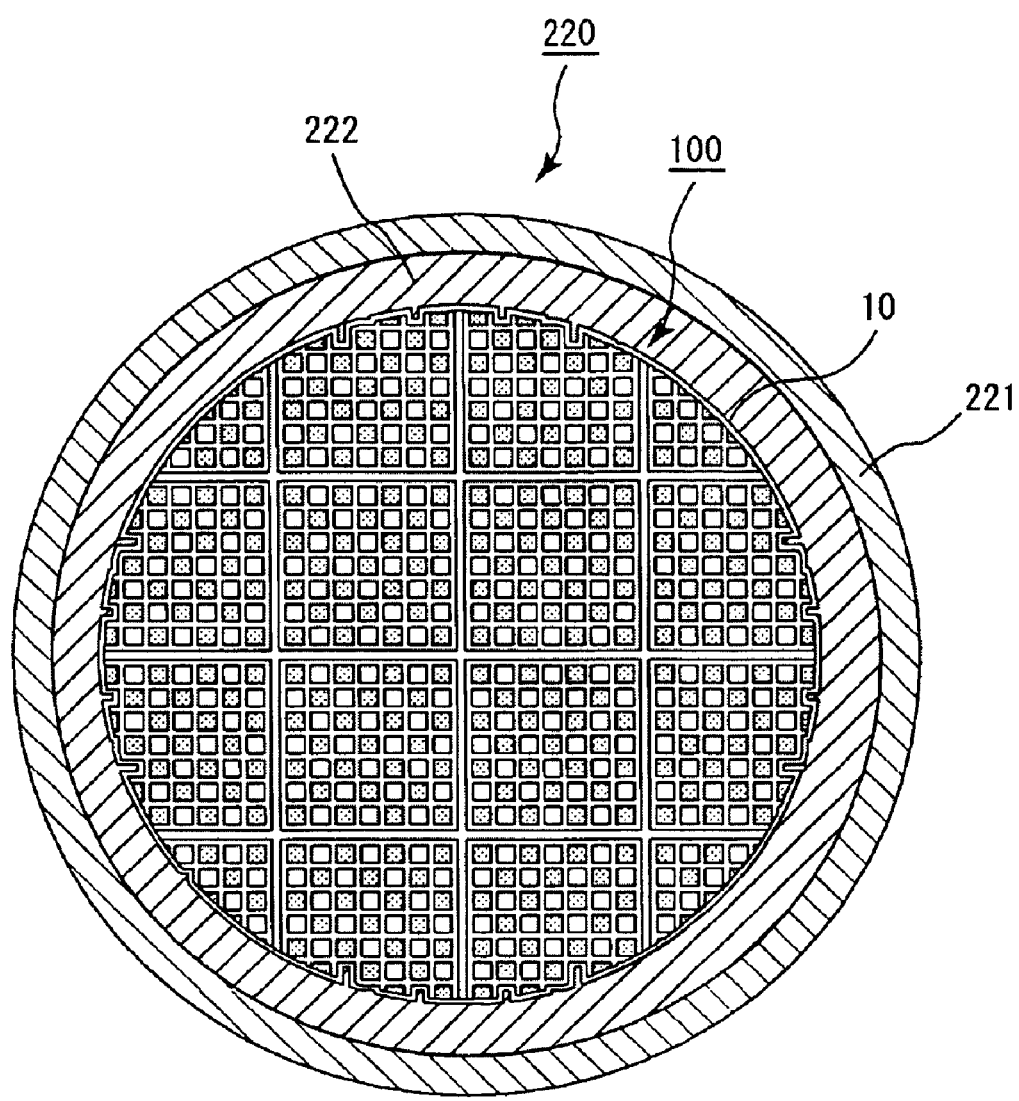
FIG. 8 is a D-D line cross-sectional view of the exhaust gas purifying apparatus shown in FIG. 7.

FIG. 8 is a D-D line cross-sectional view of the exhaust gas purifying apparatus shown in FIG. 7.

In the exhaust gas purifying apparatus 220 in which the honeycomb filter 100 of the present embodiment is installed, the holding sealing material 222 is placed so as to embedding the irregularities formed on the peripheral face 10 of the honeycomb filter 100 of the present embodiment. Accordingly, the coefficient of friction between the holding sealing material and the peripheral face of the honeycomb filter becomes higher.

For this reason, even when thermal expansion and thermal shrinkage are repeated in the honeycomb filter 100 because of the application of heat, the honeycomb filter 100 in the casing 221 tends not to be displaced.

The effects of the honeycomb filter of the present embodiment will be listed in the following.

(1) Since the irregularities exist on the peripheral face of the honeycomb filter of the present embodiment, when the honeycomb filter is installed in the casing, the coefficient of friction between the holding sealing material wound around the honeycomb filter and the peripheral face of the honeycomb filter tends to be higher. For this reason, even when thermal expansion and thermal shrinkage are repeated in the honeycomb filter because of the application of heat, the honeycomb filter from the originally installed position in the casing tends not to be displaced.

(2) Moreover, the depth of the irregularities that exist on the peripheral face of the honeycomb filter is at least about 0.1 mm and at most about 0.5 mm.

For this reason, the coefficient of friction between the holding sealing material and the peripheral face of the honeycomb filter tends to be higher, and further, it may be easier to prevent exhaust gases that having not passed through the cell wall from flowing into the gap (space) between the honeycomb filter and the holding sealing material.

Here, in the honeycomb filter in which the irregularities are formed on the peripheral face of the honeycomb filter uninterruptedly from one end face side to another end face side, the shape of the peripheral face of the honeycomb filter tends to be more complicated. Accordingly, when the honeycomb filter is installed in the casing, the coefficient of friction between the holding sealing material wound around the honeycomb filter and the peripheral face of the honeycomb filter tends to be much higher. For this reason, even when thermal expansion and thermal shrinkage are repeated in the honeycomb filter because of the application of heat, the displacement of the honeycomb filter from the originally installed position in the casing tends to be effectively prevented.

EXAMPLES

The following description will discuss Examples that specifically disclose the first embodiment of the present invention. Here, the present invention is not intended to be limited only to these Examples.

Example 1

An amount of 52.8% by weight of a silicon carbide coarse powder having an average particle diameter of 22 μm and 22.6% by weight of a silicon carbide fine powder having an average particle diameter of 0.5 μm were mixed. To the resulting mixture, 2.1% by weight of an acrylic resin, 4.6% by weight of an organic binder (methylcellulose), 2.8% by weight of a lubricant (UNILUB, manufactured by NOF Corporation), 1.3% by weight of glycerin, and 13.8% by weight of water were added, and then kneaded to prepare a wet mixture. The obtained wet mixture was extrusion-molded, so that a raw honeycomb molded body having almost the same shape as the shape shown in FIG. 2A and having cells not sealed was manufactured.

Next, the raw honeycomb molded body was dried by using a microwave drying apparatus to obtain a dried honeycomb molded body. Then, using a plug material paste having the same composition as that of the raw molded body, predetermined cells were filled, and the dried honeycomb molded body filled with the plug material paste was again dried by using a drying apparatus.

The dried honeycomb molded body was degreased at 400° C., and then fired at 2200° C. under normal pressure and argon atmosphere for three hours, so that a honeycomb fired body including a silicon carbide sintered body, with a porosity of 45%, an average pore diameter of 15 μm, a size of 34.3 mm ■ 34.3 mm ■ 150 mm, the number of cells (cell density) of 300 pcs/inch$^2$ and a thickness of the cell wall of 0.25 mm (10 mil), was manufactured.

By using a heat resistant sealing material paste containing 30% by weight of alumina fibers having an average fiber length of 20 μm, 21% by weight of silicon carbide particles having an average particle diameter of 0.6 μm, 15% by weight of silica sol, 5.6% by weight of carboxymethylcellulose and 28.4% by weight of water, a plurality of honeycomb fired bodies were bonded to one another, and the sealing material paste was dried and solidified at 120° C. so as to form sealing material layers; thus, a rectangular pillar-shaped ceramic block was manufactured.

Subsequently, the periphery of the rectangular pillar-shaped ceramic block was cut by using a diamond cutter so that a ceramic block having an almost round pillar shape was manufactured.

On the peripheral face of this ceramic block, irregularities including projected portions, each formed by a part of the cell wall of the honeycomb fired body projecting from the cell wall, were formed.

Subsequently, a sealing material paste, prepared by adding 30% by weight of water to 70% by weight of the sealing material paste used for forming the adhesive layer and further kneading, was applied to the peripheral face of the ceramic block along the irregularities thereon so that the irregularities existed (remained) on the peripheral face by using a squeegee having a cylindrical (pipe) shape.

Then, the sealing material paste applied to the peripheral face of the ceramic block was dried and solidified at 120° C. so as to form sealing material layers; thus, a round pillar-shaped honeycomb filter having a sealing material layer on the peripheral face and irregularities existing on the peripheral face, was manufactured.

With respect to the honeycomb filter manufactured in Example 1, the depth of the irregularities on the peripheral face was measured and found to be 0.3 mm.

Examples 2, 3

Honeycomb filters were respectively manufactured by following the same procedure as in Example 1 except that the depth of the irregularities existing (remaining) on the peripheral face of the honeycomb filter was changed as shown in Table 1, by changing the amount (thickness) of the sealing material paste to be applied and the pressure to be applied to the ceramic block from the squeegee and the gap between the squeegee and the ceramic block.

Comparative Example 1

A honeycomb filter was manufactured by following the same procedure as in Example 1 except that the amount of the sealing material paste to be applied to the peripheral face of the ceramic block was increased and the gap between the squeegee and the ceramic block was changed so as to fill all the irregularities on the periphery of the ceramic block and make the peripheral face of the honeycomb filter smooth.

Comparative Example 2

A honeycomb filter including a round pillar-shaped ceramic block was manufactured by following the same procedure as in Example 1 except that a sealing material layer was not formed on the peripheral face of the ceramic block.

With respect to the honeycomb filters manufactured in these Examples and Comparative Examples, performances when installed in an exhaust gas purifying apparatus were evaluated.

(Evaluation of Displacement of the Honeycomb Filter)

As shown in FIG. 7, a holding sealing material is wound around the honeycomb filter and the honeycomb filter was installed in the exhaust gas purifying apparatus. Further, one end of the exhaust gas purifying apparatus was connected to a 2 L (liter) common-rail-type diesel engine.

Then, the engine was driven at the number of revolutions of 2000 min$^{-1}$ and a torque of 47 Nm so that exhaust gases from the engine were allowed to pass through the honeycomb filter. The apparatus was driven until 6.0 g of PM per liter of the honeycomb filter was captured, and regenerating process of the honeycomb filter was carried out through burning the PM by post injection. This was defined as one cycle.

After repeating this cycle 50 times, a degree of the displacement of the honeycomb filter compared to the position before the test was visually observed.

With respect to the honeycomb filter manufactured in each Example and the like, a shift length (mm) was collectively shown in Table 1.

(Evaluation of PM Leakage)

In the same manner as in the evaluation test for displacement, the honeycomb filter was installed in an exhaust gas purifying apparatus, and exhaust gases from the engine were allowed to pass through the honeycomb filter.

After having the exhaust gases pass through the honeycomb filter for one hour, the exhaust gas purifying apparatus was disassembled. Then, the surface of the holding sealing material wound around the peripheral face of the honeycomb filter was visually observed to confirm whether or not any leakage of PM through the peripheral face of the honeycomb filter had occurred. With respect to the honeycomb filters manufactured in each Example and each Comparative Example, the presence or absence of the leakage of PM from the peripheral face of the honeycomb filter was checked, and the result was collectively shown in Table 1.

TABLE 1

|  | Honeycomb filter | | | Evaluation result | |
| --- | --- | --- | --- | --- | --- |
|  | Presence or absence of sealing material layer | Presence or absence of irregularities on peripheral face | Depth of irregularities (mm) | Displacement (mm) | Presence or absence of PM leakage |
| Example 1 | Present | Present | 0.3 | <1 | Absent |
| Example 2 | Present | Present | 0.1 | <1 | Absent |
| Example 3 | Present | Present | 0.5 | <1 | Absent |
| Comparative Example 1 | Present | Absent | — | 15 | Absent |
| Comparative Example 2 | Absent | Present | 1.1 | <1 | Present |

In the case where the honeycomb filter manufactured in each Example was used, even after repeating the regeneration process, namely, even after thermal expansion and thermal shrinkage had been repeated in the honeycomb filter, the displacement of the honeycomb filter in the casing was less than 1 mm.

In contrast, in a case where the regeneration process was carried out repeatedly on the honeycomb filter manufactured in Comparative Example 1, the displacement of the honeycomb filter in the casing became greater.

As a result, it is presumed that in the honeycomb filters of each Example, since the irregularities existed on the peripheral face of the honeycomb filter, the coefficient of friction between the holding sealing material wound around the honeycomb filter and the peripheral face of the honeycomb filter became higher.

Moreover, in the honeycomb filter of each Example having the sealing material layer formed thereon, no PM leakage was observed from the peripheral face of the honeycomb filter.

In contrast, in the honeycomb filter manufactured in Comparative Example 2, since no sealing material layer was formed on the peripheral face, PM leakage from the peripheral face of the honeycomb filter was observed.

That is, it is considered that, by forming the sealing material layer on the peripheral face of the honeycomb filter, the PM leakage from the peripheral face of the honeycomb filter can be prevented.

Second Embodiment

The following description will discuss a second embodiment that is another embodiment of the present invention.

In the present embodiment, a plurality of kinds of honeycomb fired bodies (honeycomb molded bodies) having respectively different cross-sectional shapes were manufactured, and by combining the plurality of kinds of honeycomb fired bodies, a ceramic block having an almost round pillar shape was manufactured without cutting the periphery thereof, so that the honeycomb filter according to the embodiments of the present invention was manufactured.

Figure 9A:
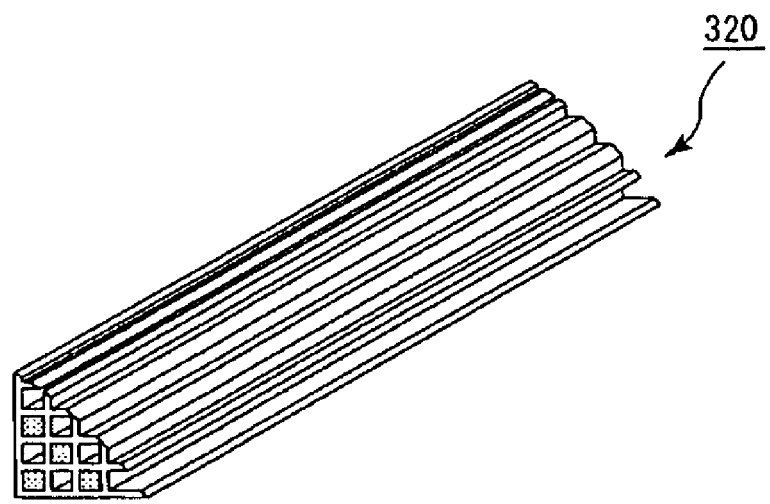
FIGS. 9A, 9B and 9C are perspective views each schematically showing one example of the honeycomb fired body constituting the honeycomb filter of a second embodiment.
Figure 9B:
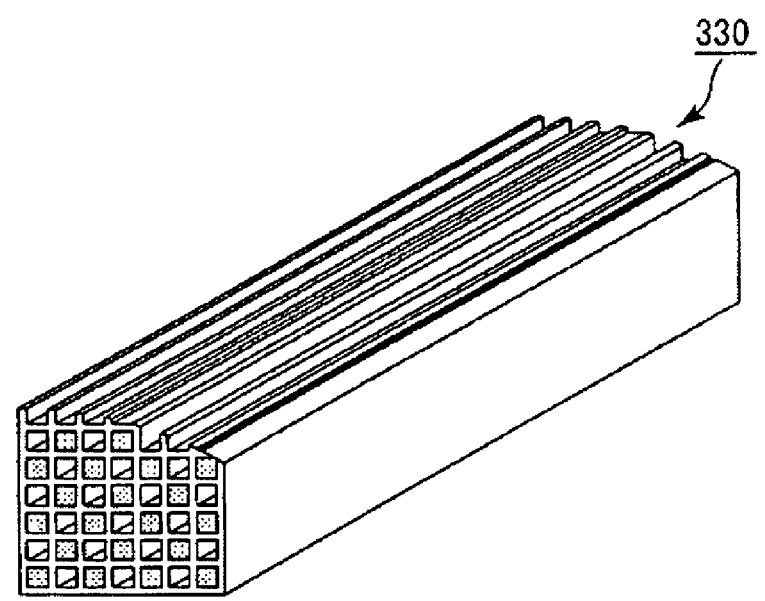
Figure 9C:
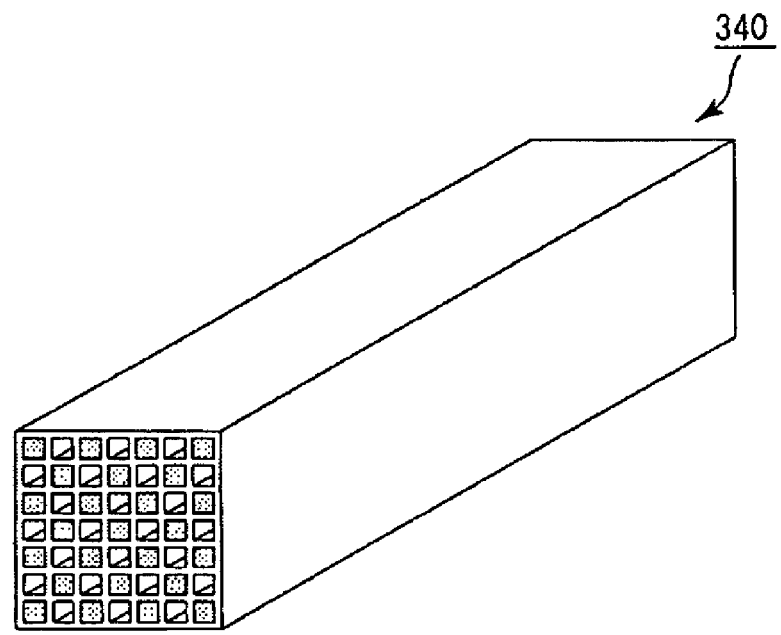

FIGS. 9A, 9B and 9C are perspective views each schematically showing one example of the honeycomb fired body constituting a honeycomb filter of the second embodiment.

A honeycomb fired body 320, shown in FIG. 9A, has one side face having irregularities thereon and two smooth side faces.

A honeycomb fired body 330, shown in FIG. 9B, has one side face having irregularities thereon and three smooth side faces.

A honeycomb fired body 340, shown in FIG. 9C, has no side face having irregularities thereon, but four smooth side faces to provide a rectangular pillar shape.

In the present embodiment, four rectangular pillar-shaped honeycomb fired bodies 340 were disposed in the center and eight honeycomb fired bodies 330 were disposed around the center honeycomb fired bodies 340 so as to be adjacent thereto. Further, four honeycomb fired bodies 320 were disposed adjacent to the honeycomb fired bodies 330. Then, respective honeycomb fired bodies were combined with one another with adhesive layers interposed between the side faces thereof, so that a ceramic block was manufactured.

The cross-sectional shape perpendicular to the longitudinal direction of the ceramic block thus manufactured is almost the same as the cross-sectional shape of the ceramic block having an almost round pillar shape shown in FIG. 4.

On the peripheral face of this ceramic block, irregularities are formed, which are derived from the shapes of the side faces having irregularities thereon of the honeycomb fired bodies 320 and the honeycomb fired bodies 330.

Moreover, by thinly applying a sealing material paste to the peripheral face of the ceramic block along the irregularities formed thereon, a sealing material layer is formed in a manner so as to allow the irregularities to exist (remain) thereon; thus a honeycomb filter having a peripheral face with irregularities formed thereon can be manufactured.

Figure 10:
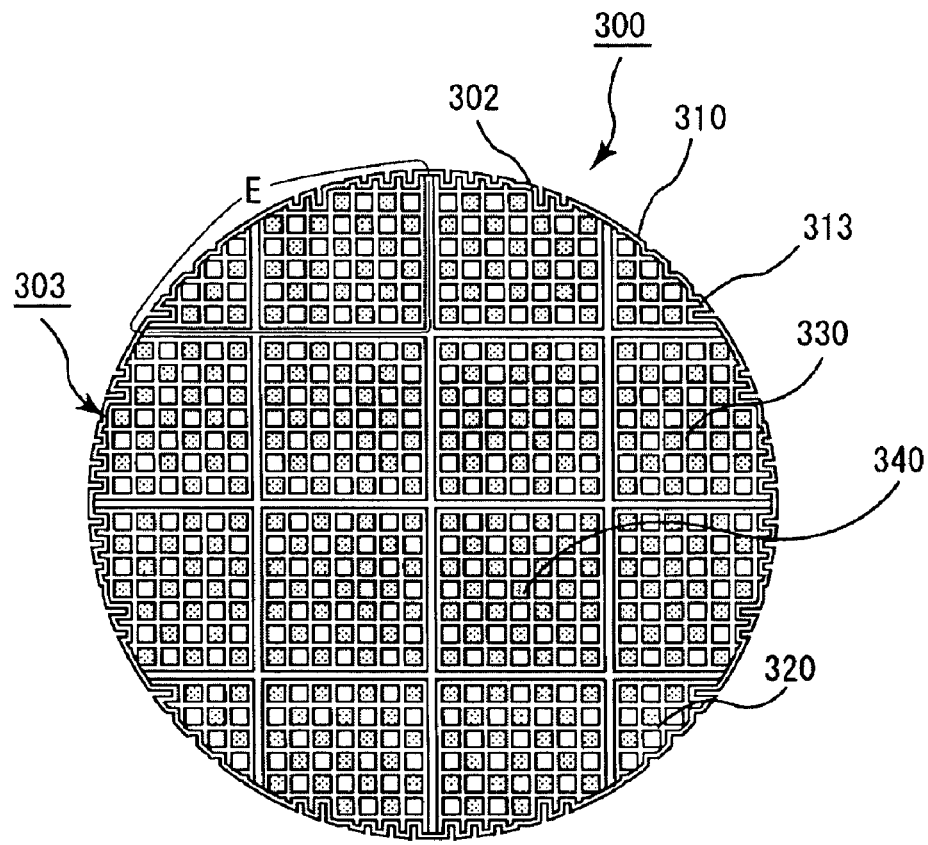
FIG. 10 is a perspective view schematically showing another example of a honeycomb filter according to a second embodiment of the present invention.

FIG. 10 is a perspective view schematically showing one example of a honeycomb filter of the present embodiment.

Figure 11:
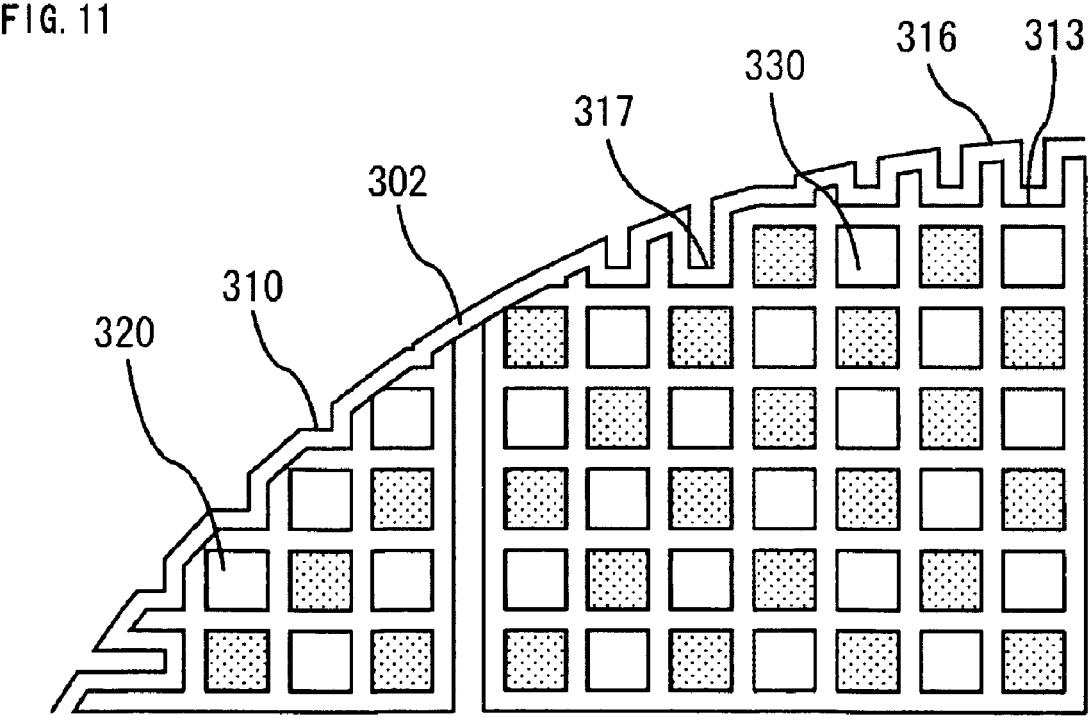
FIG. 11 is an enlarged cross-sectional view showing an area surrounded by a curved line E in FIG. 10.

FIG. 11 is an enlarged cross-sectional view showing an area surrounded by a curved line E in FIG. 10.

As shown in FIGS. 10 and 11, a sealing material layer 302 is formed along the irregularities on a peripheral face 313 of a ceramic block 303, and particularly formed along all the surfaces of irregularities on the peripheral face 313 of the ceramic block 303 in a honeycomb filter 300 according to the present embodiment.

Accordingly, on the peripheral face 310 of the honeycomb filter 300, there exist the irregularities (a projecting portion 316 and a recessed portion 317) derived from the irregularities on the peripheral face 313 of the ceramic block 303, and the shape of irregularities existing on the peripheral face 310 of the honeycomb filter 300 corresponds to the shape of the irregularities on the peripheral face 313 of the ceramic block 303.

Here, each honeycomb fired body to be used in the present embodiment can be manufactured by following the same procedure as in the first embodiment except that the shape of a die to be used when a honeycomb molded body is formed through extrusion molding process is different.

The honeycomb filter of the present embodiment can also exert effects (1) and (2) described in the first embodiment.

Here, as shown in FIGS. 10 and 11, in the honeycomb filter of the present embodiment, the cells which form the peripheral face of the almost round pillar-shaped ceramic block are not sealed. Therefore, the irregularities are formed on the peripheral face of the honeycomb filter uninterruptedly from one end face side to another end face side. Thus, in the honeycomb filter according to the present embodiment, the shape of the peripheral face of the honeycomb filter becomes more complicated.

Accordingly, when the honeycomb filter according to the present embodiment is installed in the casing, the coefficient of friction between the holding sealing material wound around the honeycomb filter and the peripheral face of the honeycomb filter tends to be much higher. For this reason, even when thermal expansion and thermal shrinkage are repeated in the honeycomb filter because of the application of heat, the displacement of the honeycomb filter from the originally installed position in the casing tends to be effectively prevented.

Other Embodiments

The shape of the honeycomb filter according to the embodiments of the present invention is not particularly limited to an almost round pillar shape, and may be a desired pillar shape such as an almost cylindroid shape, an almost pillar shape with a racetrack end face and an almost polygonal pillar shape.

Although not particularly limited, the shape of the honeycomb fired bodies is preferably designed to easily combine the honeycomb fired bodies with one another when forming a ceramic block. For example, a square, rectangular, hexagonal or sector shape may be used as its cross-sectional shape.

The porosity of the honeycomb fired body is not particularly limited, and desirably at least about 35% and at most about 60%.

When the honeycomb fired body is used as a filter, the porosity of about 35% or more tends not to cause clogging in the honeycomb filter according to the embodiments of the present invention. In contrast, the porosity of about 60% or less tends not to cause a reduction in the strength of the honeycomb fired body, resulting in less possible breakage.

The average pore diameter of the honeycomb fired body constituting the honeycomb filter according to the embodiments of the present invention is desirably at least about 5 μm and at most about 30 μm.

When the honeycomb fired body is used as a filter, the average pore diameter of about 5 μm or more tends not to cause clogging due to PM. In contrast, the average pore diameter of about 30 μm or less tends not cause PM to pass through the pores. As a result, the honeycomb fired body is more likely to capture the PM, which enables functioning as a filter.

Here, the porosity and the average pore diameter can be measured through conventionally known methods such as a mercury porosimetry, Archimedes method, and a measuring method using a scanning electronic microscope (SEM).

The thickness of the cell wall of the honeycomb fired body constituting the honeycomb filter according to the embodiments of the present invention is not particularly limited, however, desirably at least about 0.2 and at most about 0.4 mm.

The thickness of the cell wall of about 0.2 mm or more tends not to cause the thickness of the cell walls supporting the honeycomb structure to become too thin, which is more likely to maintain the strength of the honeycomb filter; in contrast, the thickness of about 0.4 mm or less tends not to cause an increase in the pressure loss.

Further, the cell density in the cross-section perpendicular to the longitudinal direction of the honeycomb filter according to the embodiments of the present invention is not particularly limited. However, a desirable lower limit thereof is about 31.0 pcs/cm$^2$ (about 200 pcs/inch$^2$) and a desirable upper limit is about 93.0 pcs/cm$^2$ (about 600 pcs/inch$^2$). A more desirable lower limit is about 38.8 pcs/cm$^2$ (about 250 pcs/inch$^2$) and a more desirable upper limit is about 77.5 pcs/cm$^2$ (about 500 pcs/inch$^2$).

The main component of the material of the honeycomb filter according to the embodiments of the present invention is not limited to silicon carbide, and may be ceramics (silicon-containing silicon carbide) in which metallic silicon is blended with silicon carbide.

Especially, a silicon-containing silicon carbide ceramic containing about 60 wt % or more of silicon carbide is desirable.

In addition, the silicon carbide may specifically include a recrystallized SiC or a reaction-sintered SiC.

The particle diameter of the ceramic powder is not particularly limited, and the ceramic powder that tends not to cause the case where the size of the honeycomb fired body manufactured by the following firing treatment becomes smaller than that of the honeycomb molded body after degreased is preferable.

The organic binder in the wet mixture is not particularly limited, and examples thereof include methylcellulose, carboxymethylcellulose, hydroxyethylcellulose, polyethylene glycol, and the like. Methylcellulose is desirable out of these. A blending amount of the organic binder is desirably at least about 1 part by weight and at most about 10 parts by weight with respect to 100 parts by weight of ceramic powder.

The plasticizer in the wet mixture is not particularly limited, and examples thereof include glycerin and the like. The lubricant is not particularly limited, and examples thereof include polyoxyalkylene-based compounds such as polyoxyethylene alkyl ether and polyoxypropylene alkyl ether, and the like.

Specific examples of the lubricant include polyoxyethylene monobutyl ether, polyoxypropylene monobutyl ether, and the like.

Moreover, the plasticizer and the lubricant are not required to be contained in the wet mixture in some cases.

In addition, a dispersant solution may be used upon preparing a wet mixture, and examples of the dispersant solution include water, an organic solvent such as benzene, alcohol such as methanol, and the like.

Furthermore, a molding auxiliary may be added to the wet mixture.

The molding auxiliary is not particularly limited, and examples thereof include ethylene glycol, dextrin, fatty acid, fatty acid soap, polyalcohol and the like.

Furthermore, a pore-forming agent such as balloons that are fine hollow spheres including oxide-based ceramics, spherical acrylic particles, graphite and the like may be added to the wet mixture, if necessary.

The balloon is not particularly limited, and examples thereof include alumina balloon, glass micro balloon, shirasu balloon, fly ash balloon (FA balloon), mullite balloon and the like. Alumina balloon is desirably used among these.

Though the plug material paste for sealing the cells is not particularly limited, a plug to be manufactured through the subsequent processes desirably has a porosity of 30 to 75%, and for example, it is possible to use a plug material paste having the same composition as that of the wet mixture of the raw material.

In the honeycomb filter according to the embodiments of the present invention, the sealing material paste used for forming the adhesive layer and the sealing material paste used for forming the sealing material layer (coat layer) may have either the same compositions or the different compositions.

Examples of the inorganic binder in the sealing material paste include silica sol, alumina sol, and the like. Each of these materials may be used alone, or two or more kinds of these may be used in combination. Silica sol is desirable among the inorganic binders.

Examples of the organic binder in the sealing material paste include polyvinyl alcohol, methyl cellulose, ethyl cellulose, carboxymethylcellulose, and the like. Each of these may be used alone or two or more kinds of these may be used in combination. Carboxymethylcellulose is desirable among the organic binders.

Examples of the inorganic fibers in the sealing material paste include ceramic fibers and the like such as silica-alumina, mullite, alumina, and silica. Each of these may be used alone or two or more kinds of these may be used in combination. Alumina fibers are desirable among the inorganic fibers.

Examples of the inorganic particles in the sealing material paste include carbides, nitrides, and the like, and specific examples thereof include inorganic powder or the like made from silicon carbide, silicon nitride, boron nitride and the like. Each of these may be used alone, or two or more kinds of these may be used in combination. Out of the inorganic particles, silicon carbide is desirably used due to its superior thermal conductivity.

Moreover, a pore-forming agent such as balloons that are fine hollow spheres including oxide-based ceramics, spherical acrylic particles, graphite and the like may be added to the adhesive paste and the sealing material paste, if necessary. The balloons are not particularly limited, and examples thereof include alumina balloons, glass micro-balloons, shirasu balloons, fly ash balloons (FA balloons), mullite balloons, and the like. Alumina balloons are more desirably-used among these.

The method for forming the adhesive layer is not limited to the method described in the first embodiment and may be a method in which each of the honeycomb fired bodies is temporarily fixed in a molding frame having almost the same shape as the shape of the ceramic block to be manufactured and a sealing material paste is injected into the each gap between the honeycomb fired bodies, and the like.

The catalyst to convert or purify exhaust gases may be supported on the honeycomb filter according to the embodiments of the present invention, and desirable examples of the catalyst to be supported include noble metals such as platinum, palladium and rhodium. Out of these, platinum is more desirable. Moreover, an alkali metal such as potassium and sodium, and an alkali earth metal such as barium maybe used as other catalysts. These catalysts may be used alone, or two or more kinds of these may be used in combination.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A honeycomb filter comprising:
a ceramic block having a peripheral face with irregularities and comprising:
a plurality of honeycomb fired bodies each having a longitudinal direction and a plurality of cell walls extending along the longitudinal direction to define a plurality of cells each sealed at either one of both ends of each of said cells, the plurality of honeycomb fired bodies comprising at least one of silicon carbide and silicon-containing silicon carbide;
an adhesive layer provided between the plurality of honeycomb fired bodies to connect the plurality of honeycomb fired bodies; and
the irregularities on the peripheral face comprising a projected portion formed by a part of the plurality of cell walls; and
a sealing material layer provided on the peripheral face of said ceramic block in accordance with the irregularities on the peripheral face so that an outer peripheral surface of the honeycomb filter has surface irregularities thereon,
wherein a thickness of the sealing material layer is less than a maximum depth of the irregularities on the peripheral face such that the sealing material layer does not fill all of the irregularities on the peripheral face.

2. The honeycomb filter according to claim 1, wherein said irregularities on the peripheral face of said ceramic block are formed by processing the peripheral face of the ceramic block.

3. The honeycomb filter according to claim 1, wherein said sealing material layer is provided on an entire surface of the peripheral face with the irregularities.

4. The honeycomb filter according to claim 1, wherein the surface irregularities on the outer peripheral surface of said honeycomb filter have a depth of at least about 0.1 mm and at most about 0.5 mm.

5. The honeycomb filter according to claim 1, wherein said adhesive layer and said sealing material layer comprise same material.

6. The honeycomb filter according to claim 1, wherein the sealing material layer comprises at least one of an inorganic binder, an organic binder, inorganic fibers, and inorganic particles.

7. The honeycomb filter according to claim 1, wherein the thickness of said sealing material layer is at least about 0.1 mm and at most about 0.5 mm.

8. The honeycomb filter according to claim 1, wherein said surface irregularities are formed on the outer peripheral surface of said honeycomb filter uninterruptedly from one end face side to another end face side.

9. The honeycomb filter according to claim 1, wherein the plurality of honeycomb fired bodies have different cross-sectional shapes, respectively.

10. The honeycomb filter according to claim 9, wherein said plurality of honeycomb fired bodies have a rectangular pillar shape with four side faces and comprises, a first honeycomb fired body having one side face with irregularities thereon and two smooth side faces;
a second honeycomb fired body having one side face with irregularities thereon and three smooth side faces; and
a third honeycomb fired body having four smooth side faces.

11. The honeycomb filter according to claim 1, wherein a shape of said honeycomb filter is substantially a round pillar shape, a cylindroid shape, a pillar shape with a racetrack end face, or a polygonal pillar shape.

12. The honeycomb filter according to claim 1, wherein a cross-sectional shape of said honeycomb fired bodies is substantially a square, rectangular, hexagonal or sector shape.

13. The honeycomb filter according to claim 1, wherein a catalyst to purify exhaust gases is provided on said honeycomb filter.

14. The honeycomb filter according to claim 13, wherein said catalyst comprises at least one of noble metal and alkali earth metal.

15. An exhaust gas purifying apparatus comprising:
a honeycomb filter;
a casing which houses said honeycomb filter; and
a holding material provided between said honeycomb filter and said casing to hold the honeycomb filter in said casing, said honeycomb filter comprising:
a ceramic block having a peripheral face with irregularities and comprising:
a plurality of honeycomb fired bodies each having a longitudinal direction and a plurality of cell walls extending along the longitudinal direction to define a plurality of cells each sealed at either one of both ends of each of said cells, the plurality of honeycomb fired bodies comprising at least one of silicon carbide and silicon-containing silicon carbide;
an adhesive layer provided between the plurality of honeycomb fired bodies to connect the plurality of honeycomb fired bodies; and
the irregularities on the peripheral face comprising a projected portion formed by a part of the plurality of cell walls; and
a sealing material layer provided on the peripheral face of said ceramic block in accordance with the irregularities on the peripheral face so that an outer peripheral surface of the honeycomb filter has surface irregularities thereon,
wherein a thickness of the sealing material layer is less than a maximum depth of the irregularities on the peripheral face such that the sealing material layer does not fill all of the irregularities on the peripheral face.

16. The exhaust gas purifying apparatus according to claim 15, wherein said irregularities on the peripheral face of said ceramic block are formed by processing the peripheral face of the ceramic block.

17. The exhaust gas purifying apparatus according to claim 15, wherein said sealing material layer is provided on an entire surface of the peripheral face with the irregularities.

18. The exhaust gas purifying apparatus according to claim 15, wherein the surface irregularities on the outer peripheral surface of said honeycomb filter have a depth of at least about 0.1 mm and at most about 0.5 mm.

19. The exhaust gas purifying apparatus according to claim 15, wherein said adhesive layer and said sealing material layer comprise same material.

20. The exhaust gas purifying apparatus according to claim 15, wherein the sealing material layer comprises at least one of an inorganic binder, an organic binder, inorganic fibers, and inorganic particles.

21. The exhaust gas purifying apparatus according to claim 15, wherein the thickness of said sealing material layer is at least about 0.1 mm and at most about 0.5 mm.

22. The exhaust gas purifying apparatus according to claim 15, wherein said surface irregularities are formed on the outer peripheral surface of said honeycomb filter uninterruptedly from one end face side to another end face side.

23. The exhaust gas purifying apparatus according to claim 15, wherein the plurality of honeycomb fired bodies have different cross-sectional shapes, respectively.

24. The exhaust gas purifying apparatus according to claim 23, wherein said plurality of honeycomb fired bodies have a rectangular pillar shape with four side faces and comprises,
a first honeycomb fired body having one side face with irregularities thereon and two smooth side faces;
a second honeycomb fired body having one side face with irregularities thereon and three smooth side faces; and
a third honeycomb fired body having four smooth side faces.

25. The exhaust gas purifying apparatus according to claim 15, wherein a shape of said honeycomb filter is substantially a round pillar shape, a cylindroid shape, a pillar shape with a racetrack end face, or a polygonal pillar shape.

26. The exhaust gas purifying apparatus according to claim 15, wherein a cross-sectional shape of said honeycomb fired bodies is substantially a square, rectangular, hexagonal or sector shape.

27. The exhaust gas purifying apparatus according to claim 15, wherein a catalyst to purify exhaust gases is provided on said honeycomb filter.

28. The exhaust gas purifying apparatus according to claim 27, wherein said catalyst comprises at least one of noble metal and alkali earth metal.

* * * * *